US011097984B2

(12) United States Patent
Li et al.

(10) Patent No.: US 11,097,984 B2
(45) Date of Patent: Aug. 24, 2021

(54) COMPOSITE CERAMIC AND PREPARATION METHOD THEREFOR

(71) Applicant: APPOTRONICS CORPORATION LIMITED, Shenzhen (CN)

(72) Inventors: Qian Li, Guangdong (CN); Mengmeng Xu, Guangdong (CN); Yusan Chen, Guangdong (CN); Yanzheng Xu, Guangdong (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/626,090

(22) PCT Filed: Sep. 26, 2017

(86) PCT No.: PCT/CN2017/103417
§ 371 (c)(1),
(2) Date: Dec. 23, 2019

(87) PCT Pub. No.: WO2019/000671
PCT Pub. Date: Jan. 3, 2019

(65) Prior Publication Data
US 2020/0385312 A1 Dec. 10, 2020

(30) Foreign Application Priority Data
Jun. 28, 2017 (CN) .......................... 201710506457.3

(51) Int. Cl.
*C04B 35/117* (2006.01)
(52) U.S. Cl.
CPC .... *C04B 35/117* (2013.01); *C04B 2235/3206* (2013.01); *C04B 2235/3225* (2013.01);
(Continued)

(58) Field of Classification Search
CPC .......... C04B 35/117; C04B 2235/3206; C04B 2235/3225; C04B 2235/66;
(Continued)

(56) References Cited

U.S. PATENT DOCUMENTS

2008/0251765 A1 10/2008 Shida et al.
2018/0122993 A1* 5/2018 Camras .................. C23C 16/40
(Continued)

FOREIGN PATENT DOCUMENTS

CN 1667081 A 9/2005
CN 103450876 A 12/2013
(Continued)

OTHER PUBLICATIONS

CN104291796 machine translation via EspaceNet (Year: 2015).*
(Continued)

*Primary Examiner* — Karl E Group
*Assistant Examiner* — Cameron K Miller
(74) *Attorney, Agent, or Firm* — Marshall, Gerstein & Borun LLP

(57) ABSTRACT

A composite ceramic with improved mechanical performance and a preparation method therefor. The composite ceramic comprises fluorescent powder, a ceramic matrix, and an optional sintering aid. The weight ratio of the fluorescent powder to the ceramic matrix is from 3:17 to 9:1, and the relative density of the composite ceramic is greater than 95%. The preparation method comprises using core shell-structured coated fluorescent powder as a raw material, and ball-milling and sintering the raw material to obtain the composite ceramic.

14 Claims, 2 Drawing Sheets

(52) U.S. Cl.
CPC .... *C04B 2235/66* (2013.01); *C04B 2235/764* (2013.01); *C04B 2235/785* (2013.01); *C04B 2235/786* (2013.01)

(58) Field of Classification Search
CPC ........ C04B 2235/764; C04B 2235/785; C04B 2235/786
See application file for complete search history.

(56) References Cited

U.S. PATENT DOCUMENTS

| | | | | |
|---|---|---|---|---|
| 2019/0233333 | A1* | 8/2019 | Moteki | C04B 35/62695 |
| 2020/0144789 | A1* | 5/2020 | Oshio | H01L 33/504 |

FOREIGN PATENT DOCUMENTS

| | | | | |
|---|---|---|---|---|
| CN | 103626487 | * | 3/2014 | |
| CN | 104291796 | * | 1/2015 | ........... C04B 35/115 |
| CN | 104291796 | A | 1/2015 | |
| CN | 104357043 | A | 2/2015 | |
| CN | 106673652 | A | 5/2017 | |
| JP | S6315878 | A | 1/1988 | |
| JP | 2006188030 | A | 7/2006 | |
| WO | WO-03040727 | A2 | 5/2003 | |

OTHER PUBLICATIONS

Office Action issued for Application No. 201710506457.3 issued to China, dated Jan. 22, 2021.

Xuejian Liu, Rong-Jun Xie et al., Royal Society of Chemistry, "Al2O3-Yag Ce composite phosphor ceramic: a thermally robust and efficient color converter for solid state laser lighting," Journal of Materials Chemistry C, Materials for optical, magnetic and electronic devices, vol. 4 No. 37, pp. 8585-8830, ISSN 2050-7526, www.rsc.org/MaterialsC, Oct. 7, 2016.

International Search Report for International Application No. PCT/CN2017/103417, dated Apr. 12, 2018.

* cited by examiner

This is the United States national phase of International Patent Application No. PCT/CN2017/103417, filed Sep. 26, 2017, which claims priority to Chinese Application No. 201710506457.3, filed Jun. 28, 2017. The entirety of each of the foregoing applications are hereby incorporated by reference.

COMPOSITE CERAMIC AND PREPARATION METHOD THEREFOR

CROSS-REFERENCE TO RELATED APPLICATION

TECHNICAL FIELD

The present disclosure relates to a composite ceramic and a preparation method therefor, and particularly, to a composite ceramic for a laser light source and a preparation method therefor.

BACKGROUND

Laser light sources, due to their advantages such as large color gamut, high efficiency and long service life, are widely applied in systems for illumination, projection and display to excite fluorescent conversion materials to obtain predetermined monochromatic or polychromatic light. It can been seen that performances of illumination, projection, display, and the like are directly affected by performances of the fluorescent conversion materials, such as optical conversion efficiency, brightness, temperature tolerance, thermal conductivity, service life, etc.

Conventional fluorescent conversion materials are prepared by using silica gel or glass encapsulated fluorescent powder technology. However, the silica gel cannot bear a temperature above 200-250° C. due to its low thermal conductivity, and thus is likely to age after long-term work under high temperature environment, and the service life is not long. Even when glass that can withstand higher temperatures is used, the requirements of high-power laser sources on fluorescent conversion materials cannot be satisfied due to the low thermal conductivity of the glass.

Therefore, it is conducive to solving the above problem by adopting a ceramic material whose temperature resistance and thermal conductivity are both higher than the silica gel and glass to encapsulate the fluorescent powder. In the existing solid phase method for preparing a luminescent composite ceramic, a commercial fluorescent powder may be encapsulated by an alumina matrix.

The luminescent alumina-fluorescent powder composite ceramic is mainly prepared by using a powder sintering method. Mainly involved in sintering are alumina powder particles which serve as a material matrix. These powder particles would enter the liquid phase sintering to form continuous distributed crystals, which grow to a certain new size. In most cases, the fluorescent powder particles (generally YAG, LuAG type) have a much larger particle size than the alumina particles, and does not enter the liquid phase sintering during the sintering process, or only a small part enters the liquid phase sintering (mainly achieved by temperature control, i.e., the sintering temperature of alumina is lower than a temperature at which the fluorescent powder enters the liquid phase sintering, mainly for protecting the integrity of the fluorescent powder crystalline grains and guaranteeing luminescent performances). Therefore, the bonding of alumina and fluorescent powder is mainly determined by a degree of surface wetting of the alumina entering the liquid phase on the fluorescent powder particles, and degrees of precipitation and recrystallization of the alumina. For this purpose, higher sintering temperature and longer sintering time are usually required. However, it causes that the fluorescent powder particles enter the liquid phase sintering more easily, and morphology and performances of the grains are changed. Therefore, a crucial problem to be solved is how to improve an interface bonding degree between alumina and fluorescent powder particles without changing the original sintering process conditions in order to obtain composite ceramics with excellent comprehensive performance.

SUMMARY

An object of the present disclosure is to provide a composite ceramic and a preparation method therefor. By using fluorescent powder having a core-shell structure to prepare a luminescent composite ceramic, an interface bonding degree and an interface structure between the alumina and the fluorescent powder particle can be improved, thereby improving mechanical and optical performances of the luminescent composite ceramic.

A first aspect of the present disclosure provides a composite ceramic, including a ceramic matrix, a sintering aid, and fluorescent powder. The ceramic matrix is an alumina sintered body, the fluorescent powder is not sintered and is dispersed in a form of particles in the ceramic matrix, a weight ratio of the fluorescent powder to the ceramic matrix is 3:17 to 9:1, and the composite ceramic has a relative density of 95% to 99.9%. Alumina in the ceramic matrix has a grain size of 0.5 μm to 5 μm, the fluorescent powder has a radius of 1 μm to 10 μm, and a weight percentage of the sintering aid is 0.2 wt % to 3 wt % based on a weight of the ceramic matrix.

In a preferred embodiment of the first aspect of the present disclosure, the fluorescent powder is one or two of YAG:$Ce^{3+}$ and/or LuAG:$Ce^{3+}$.

In a preferred embodiment of the first aspect of the present disclosure, the sintering aid is MgO and/or $Y_2O_3$.

In a preferred embodiment of the first aspect of the present disclosure, the weight ratio of the fluorescent powder to the ceramic matrix is 1:5 to 5:1, preferably 1:3 to 2:1, more preferably 1:2 to 1:1.

In a preferred embodiment of the first aspect of the present disclosure, the relative density of the composite ceramic is 98% to 99.9%.

A second aspect of the present disclosure provides a preparation method for the composite ceramic according the first aspect of the present disclosure. The method includes: using core-shell structured coated fluorescent powder, alumina, and a sintering aid as raw materials, and ball-milling, pre-pressing and then sintering the raw materials to obtain the composite ceramic. The alumina has a particle size of 0.1 μm to 2 μm. A core portion of the core-shell structured coated fluorescent powder is the fluorescent powder, and the core portion has a core radius of 1 μm to 10 μm. A shell portion of the core-shell structured coated fluorescent powder contains alumina or a precursor thereof, and the shell portion has a particle size of 10 nm to 80 nm. A weight ratio of the alumina of the shell portion of the core-shell structured coated fluorescent powder to the alumina of the raw materials is 1:3 to 4:1. A weight ratio of the fluorescent powder of the core portion of the core-shell structured fluorescent powder to a sum of the alumina of the shell portion and the alumina of the raw materials is 3:17 to 9:1.

A weight ratio of the sintering aid to the sum of the alumina of the shell portion and the alumina of the raw materials is 0.2 wt % to 3 wt %.

In a preferred embodiment of the second aspect of the present disclosure, the shell portion of the core-shell structured coated fluorescent powder contains a sintering aid or a precursor thereof. The sintering aid is selected from the group consisting of MgO, $Y_2O_3$, and combinations thereof, and the precursor of the sintering aid is selected from the group consisting of $Mg(OH)_2$, $Y(OH)_3$, and combinations thereof.

In a preferred embodiment of the second aspect of the present disclosure, the core-shell structured coated fluorescent powder is synthesized by the following steps:

Step 1: preparing an aqueous solution of a soluble aluminum salt, the aqueous solution optionally comprising a soluble salt of the sintering aid or a soluble salt of cation of the sintering aid;

Step 2: preparing a precipitant solution having a pH of 4 to 10, adding a surfactant to the precipitant solution, adding the fluorescent powder, and performing ultrasonic dispersing to obtain a fluorescent powder suspension, wherein the fluorescent powder has a radius of 1 μm to 10 μm; and Step 3: dropwise adding the aqueous solution obtained in the step 1 to the fluorescent powder suspension obtained in the step 2, and performing aging, solid-liquid separation, drying, and optional heat treatment to obtain the core-shell structured coated fluorescent powder.

In a preferred embodiment of the second aspect of the present disclosure, a ball-milling duration was 30 min to 50 min.

In a preferred embodiment of the second aspect of the present disclosure, the sintering is vacuum sintering, and a sintering temperature of the vacuum sintering is 1250° C. to 1550° C.

In a preferred embodiment of the second aspect of the present disclosure, the sintering is vacuum sintering, and a holding time of the vacuum sintering is 0.5 h to 6 h.

In a preferred embodiment of the second aspect of the present disclosure, the sintering is hot-pressing sintering, and a sintering temperature of the hot-pressing sintering is 1350° C. to 1550° C.

In a preferred embodiment of the second aspect of the present disclosure, the sintering is hot-pressing sintering, and a holding time of the hot-pressing sintering is 0.5 h to 2 h.

In a preferred embodiment of the second aspect of the present disclosure, the sintering is hot-pressing sintering, and a sintering pressure of the hot-pressing sintering is 30 MPa to 60 MPa.

In a preferred embodiment of the second aspect of the present disclosure, an atmosphere of the hot-pressing sintering is any one of inert gas or nitrogen.

In a preferred embodiment of the second aspect of the present disclosure, both a crystal phase of the alumina of the shell portion of the core-shell structured coated fluorescent powder and a crystal phase of the alumina of the raw materials are α-$Al_2O_3$.

In a preferred embodiment of the second aspect of the present disclosure, the core-shell structured coated fluorescent powder is one or two of an $Al_2O_3$ coated fluorescent powder, an $Al_2O_3$ and MgO coated fluorescent powder, or an $Al_2O_3$ and $Y_2O_3$ coated fluorescent powder.

In a preferred embodiment of the second aspect of the present disclosure, the heat treatment is performed at 1100° C. to 1300° C. for 2 h to 5 h.

In a preferred embodiment of the second aspect of the present disclosure, the precipitant is selected from the group consisting of NaOH, KOH, $NH_3 \cdot H_2O$, and $NH_4HCO_3$.

In the composite ceramic and the preparation method therefor according to the present disclosure, by using the core-shell structured fluorescent powder to prepare the luminescent composite ceramic, the interface bonding degree between the alumina and the fluorescent powder particle in the luminescent composite ceramic can be improved. In this way, the mechanical performances of the alumina-fluorescent powder luminescent composite ceramic can be enhanced, and the interface structure between two phases of alumina and the fluorescent powder can also be improved, increasing the density of the composite ceramic and improving the optical performances of the luminescent composite ceramic.

DESCRIPTION OF EMBODIMENTS

Figure 1:
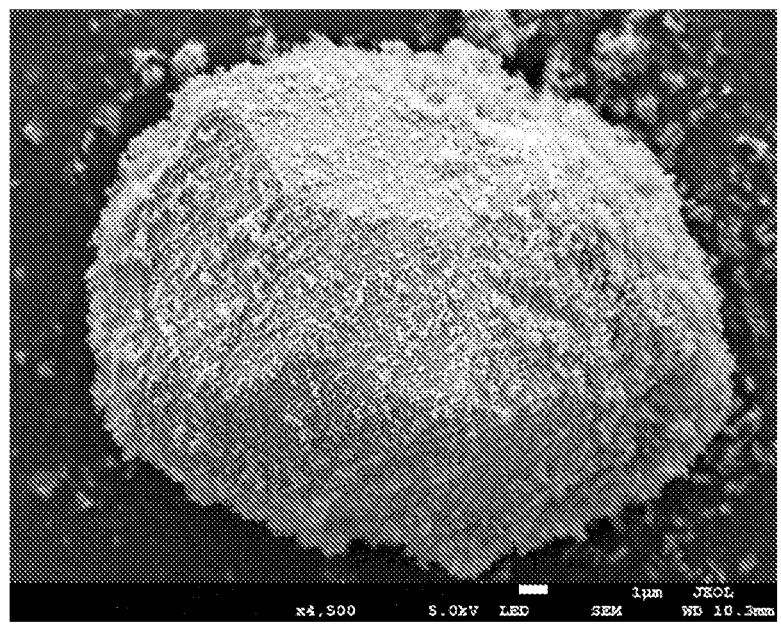
FIG. 1 is an SEM image of a core-shell structured fluorescent powder according to the present disclosure.

A composite ceramic according to the present disclosure and a method for preparing the composite ceramic will be described in detail as follow.

A first aspect of the present disclosure provides a composite ceramic. The composite ceramic includes a ceramic matrix, a sintering aid, and a fluorescent powder. The ceramic matrix is an alumina sintered body. The fluorescent powder is not sintered, and is in a form of particles dispersed in the ceramic matrix. A weight ratio of the fluorescent powder to the ceramic matrix is 3:17 to 9:1. The composite ceramic has a relative density of 95% to 99.9%. The alumina in the ceramic matrix has a grain size of 0.5 μm to 5 μm, the fluorescent powder has a radius of 1 μm to 10 μm, and a weight percentage of the sintering aid in the ceramic matrix is 0.2 wt % to 3 wt %.

In the present disclosure, "not sintered" can be understood as a case in which the fluorescent powder is slightly sintered. In the sintering process, entering the sintering (i.e., entering the liquid phase sintering) means that material particles of a certain component enter the liquid phase, or most of the surface thereof is a liquid phase and participates in the material transfer during the sintering process. The particles of the fluorescent powder have much larger particle size than other components, only a small part of local surface thereof enters the liquid phase during the sintering process, and slight material transfer occurs or even almost no material transfer occurs, which is called slight sintering and considered as a situation of "not sintered".

The fluorescent powder may be YAG:$Ce^{3+}$ and/or LuAG: $Ce^{3+}$.

The alumina powder for preparing the ceramic matrix is α-$Al_2O_3$, having a particle size of 0.1-2 μm, for example alumina powder under a trade name of TM-DAR, supplied by Taimei Chemicals Co., Ltd, Japan.

In an embodiment of the present disclosure, the sintering aid is MgO and/or $Y_2O_3$, preferably MgO. The presence of the sintering aid lowers the temperature at which the alumina enters the liquid phase, and at such a temperature, the sintering aid has no destructive effect on the fluorescent powder of the selected particle size, such that the surface morphology thereof can be maintained substantially unchanged. In this way, the composite ceramic after the sintering can retain the luminescent performances of the original fluorescent powder.

In the present disclosure, the weight ratio of the fluorescent powder to the ceramic matrix is 1:5 to 5:1, preferably 1:3 to 2:1, more preferably 1:2 to 1:1.

A second aspect of the present disclosure provides a method for preparing the composite ceramic according to the first aspect of the present disclosure. The method includes: using a core-shell structured coated fluorescent powder, alumina, and a sintering aid as raw materials, and ball-milling, pre-pressing and then sintering the raw materials to obtain the composite ceramic.

An important feature of the present disclosure is that the core-shell structured coated fluorescent powder is used to prepare the composite ceramic. In an embodiment, a core portion of the core-shell structured coated fluorescent powder is the fluorescent powder. In another embodiment, a shell portion of the core-shell structured coated fluorescent powder contains alumina or a precursor thereof, and optionally contains the sintering aid or a precursor thereof. The precursor of the alumina is, for example, aluminum hydroxide. When MgO is used as the sintering aid, the precursor of the sintering aid is for example magnesium hydroxide.

In an embodiment of the present disclosure, in the core-shell structured coated fluorescent powder, a core radius is 1-10 μm, and particles of the shell portion has a particle size of 10 nm to 80 nm.

In the method for preparing the composite ceramic according to the present disclosure, a sintering temperature, a sintering pressure, and a holding time are relatively critical parameters during the ceramic sintering. If the values of these parameters are too small, the ceramic sintering is insufficient, resulting in a low density. If the values of these parameters are too great, the ceramic may be excessively sintered and the grain size may become too large, which may reduce the mechanical performances of the ceramic.

In the luminescent composite ceramic prepared by using the fluorescent powder having the core-shell structure as a raw material, the interface bonding degree between the alumina and the fluorescent powder particles is improved, which not only improves the mechanical performances of the alumina-fluorescent powder luminescent composite ceramic, but also improves the interface structure between the two phases of the fluorescent powder and alumina, thereby increasing the density of the composite ceramic, and improving the optical performances of the luminescent composite ceramic. The composite ceramic of the present disclosure has a relative density greater than or equal to 95%, more preferably greater than or equal to 98%. A theoretical definition of relative density is a ratio of an actually measured density value to a theoretically calculated density value when being completely dense. The composite ceramic prepared by using the core-shell structured coated fluorescent powder has a higher relative density, which also constitutes an important feature of the present disclosure.

In another embodiment, the core-shell structured coated fluorescent powder of the present disclosure is synthesized by the following steps:

Step 1: preparing an aqueous solution of a soluble aluminum salt, the aqueous solution optionally containing a soluble salt of the sintering aid or a soluble salt of cation of the sintering aid;

Step 2: preparing a precipitant solution having a pH of 4-10, adding a surfactant to the precipitant solution, adding the fluorescent powder, and performing ultrasonic dispersing to obtain a fluorescent powder suspension, the fluorescent powder having a radius of 1-10 μm; and Step 3: dropwise adding the aqueous solution obtained in the step 1 to the fluorescent powder suspension obtained in the step 2, and performing aging, solid-liquid separation, drying, and optional heat treatment to obtain the core-shell structured coated fluorescent powder.

In the above method, a particle size and a coating amount of metal oxide referred as $MO_y$ coated on the fluorescent powder and an adhesion of the metal oxide to the fluorescent powder can be adjusted by changing: a concentration of the aqueous solution of the soluble aluminum salt (for example, $Al(NO_3)_3$), a molar ratio of the soluble aluminum salt to the precipitant (for example, $NH_4HCO_3$), a precipitation reaction temperature, a precipitation reaction aging time, and temperature and duration of the heat treatment, thereby affecting an sintering activity in the subsequent sintering process and a microstructure of the obtained ceramic. According to the nucleation principle, the precursor of $MO_y$ preferentially nucleates on the surface of the fluorescent powder, and a part of or all of the precursor of $MO_y$ precipitates on the surface of the fluorescent powder to obtain a powder having a composite structure similar to the core-shell structure. When the particle size of $MO_y$ is smaller, the adhesion to the fluorescent powder is better, and a stable core-shell structure can be more easily obtained.

In the above method, if the pH of the precipitant solution is too high or too low, it will affect the degree of precipitation of the soluble aluminum salt and the soluble salt of the optional sintering aid or cation thereof on the fluorescent powder, in turn affecting the coating amount of $MO_y$ on the fluorescent powder. If the coating amount of $MO_y$ is too great or too small, the subsequent dense sintering may be affected. In an embodiment of the present disclosure, the precipitant may be selected from the group consisting of NaOH, KOH, $NH_3 \cdot H_2O$, and $NH_4HCO_3$.

Ultrasound is used to destroy a secondary agglomeration of the fluorescent powder particles, so that the fluorescent powder can be sufficiently dispersed in the solution. The surfactant such as SDS is added to further improve the dispersity and suspension property of the fluorescent powder particles. Further, a surfactant other than SDS can be used.

Further, a commercially available coated fluorescent powder having the core-shell structure and satisfying the structure and size requirements of the present disclosure can also be applied to the present disclosure and achieve a high density of the sintered composite ceramic.

EXAMPLES

It should be understood that in the following examples, YAG fluorescent powder is taken as an example for illustration, but the present disclosure is not limited thereto.

Unless otherwise indicated, all the reagents used in the following examples are commercially available reagents, and the various devices involved are common devices known to those skilled in the art.

Example 1: Preparation of Core-Shell Structured Coated Fluorescent Powder 1

Step 1: Appropriate amounts of $Al(NO_3)_3 \cdot 9H_2O$ and $Mg(NO_3)_2 \cdot 6H_2O$ were weighted, and a mixed solution of $Al(NO_3)_3$ and $Mg(NO_3)_2$, denoted as $M(NO_3)_x$, was prepared, in which a concentration of $Al(NO_3)_3$ was 0.5 mol/L. A using amount of $Mg(NO_3)_2 \cdot 6H_2O$ was calculated based on a mass ratio of MgO to $Al_2O_3$ of 3:100, in which $Al_2O_3$ was obtained by a precipitation method, and a corresponding mass thereof was calculated according to the amount of $Al(NO_3)_3 \cdot 9H_2O$.

Step 2: $NH_4HCO_3$ solution (0.5 mol/L) was prepared, and sodium dodecyl sulfate (SDS) was added into the solution until a concentration of SDS in the suspension was $5.5 \times 10^{-3}$ mol/L, so as to obtain a mixed solution containing precipitant and SDS. An appropriate amount of commercial fluorescent powder YAG (such as commercial fluorescent powder having a radius of 1-10 μm, supplied by Mitsubishi) was mixed with the mixed solution to obtain a suspension of the fluorescent powder. The addition amount of SDS was calculated according to a critical micelle concentration, which requires that the concentration of SDS is greater than its critical micelle concentration after mixing the nitrate solution with the precipitant. A mass ratio of the fluorescent powder to precipitation method $Al_2O_3$ was 15:68, in which the precipitation method $Al_2O_3$ was obtained by the precipitation method, and a corresponding mass thereof was calculated according to the amount of $Al(NO_3)_3 \cdot 9H_2O$. The above solution, after ultrasound treatment for 1 h, was subjected to magnetic stirring with an appropriate magnetic stirring speed, so as to obtain a suspension of the fluorescent powder having pH value of 4. A solution of another precipitant such as NaOH, KOH or $NH_3 \cdot H2O$ can be used to replace the solution of $NH_4HCO_3$, and the same precipitation effect as the solution of $NH_4HCO_3$ can be produced as long as hydroxide ions in the solution can be kept at the same concentration (i.e., the same pH value).

Step 3: Under the magnetic stirring, the solution of $M(NO_3)_x$ was dropwise added into the suspension of the fluorescent powder, and a precursor precipitate of $Al_2O_3$ and MgO (referred to as $MO_y$) was obtained under the effect of the precipitant. After the above precipitate was aged for 1 h under the magnetic stirring, the obtained precipitate was washed with deionized water by centrifugation or suction filtration 3 times, with alcohol 3 times, and then a mixed powder of the fluorescent powder and the $MO_y$ precursor was obtained after drying. The mixed powder was subjected to a heat treatment at 1100° C. for 2 h to obtain a mixed powder of $MO_y$ and fluorescent powder, in which $MO_y$ was coated on the surface of the fluorescent powder. In this way, the core-shell structured coated fluorescent powder 1 was obtained. The parameters adopted in Example 1 are listed in Table 1 below.

Example 2: Preparation of Core-Shell Structured Coated Fluorescent Powder 2

The core-shell structured coated fluorescent powder 2 was prepared by the same method as Example 1, except adopting parameters of Example 2 listed in Table 1 below, in which N.A. indicates that the parameter is not adopted, similarly hereinafter.

Example 3: Preparation of Core-Shell Structured Coated Fluorescent Powder 3

The core-shell structured coated fluorescent powder 3 was prepared by the same method as Example 1, except adopting parameters of Example 3 listed in Table 1 below.

Example 4: Preparation of Core-Shell Structured Coated Fluorescent Powder 4

The core-shell structured coated fluorescent powder 4 was prepared by the same method as Example 1, except that only the solution of $Al(NO_3)_3$ (0.5 mol/L) is prepared in Step 1 and other parameters adopt the parameters of Example 4 listed in Table 1 below.

TABLE 1

| Parameter | Example 1 | Example 2 | Example 3 | Example 4 |
|---|---|---|---|---|
| Concentration of $Al(NO_3)_3$ (mol/L) | 0.5 | 1.5 | 3 | 0.5 |
| Mass ratio of MgO to $Al_2O_3$ obtained by precipitation method | 3:100 | 2:100 | 0.8:100 | 0 |
| Concentration of $NH_4HCO_3$ (mol/L) | 0.5 | 1.5 | 3 | 0.5 |
| Concentration of SDS ($10^{-3}$ mol/L) | 5.5 | 7.0 | 10.0 | 5.5 |
| Mass ratio of fluorescent powder to $Al_2O_3$ obtained by precipitation method | 15:68 | 1:1 | 4:1 | 45:4 |
| pH value of fluorescent powder suspension | 4 | 7 | 10 | 4 |
| Ultrasound (h) | 1 | 2 | 3 | 1 |
| Aging (h) | 1 | 5 | 10 | 2 |
| Washing by centrifugation or suction filtration (times) | 3 | 4 | 5 | 3 |
| Washing with alcohol (times) | 3 | 4 | 5 | 3 |
| Temperature of heat treatment (° C.) | 1100 | N.A. | 1300 | 1100 |
| Duration of heat treatment (h) | 2 | N.A. | 5 | 3 |

Note:
N.A. indicates that the step is absent, or the parameter is not applicable.

Example 5: Preparation of Luminescent Composite Ceramic Material 1

Step 1: the core-shell structured coated fluorescent powder 1 was taken, and an appropriate amount of high-purity ultrafine commercial $Al_2O_3$ powder was weighted (a particle size of 0.1-2 μm, alumina under a trade name of TM-DAR, purchased from Taimei Chemicals Co., Ltd, Japan). A mass ratio of the commercial $Al_2O_3$ powder to the $Al_2O_3$ obtained by precipitation method (the corresponding mass thereof is calculated according to the amount of $Al(NO_3)_3 \cdot 9H_2O$) was 1:4. A mass ratio of the fluorescent powder to the total $Al_2O_3$ (a sum of the $Al_2O_3$ obtained by precipitation method and the commercial $Al_2O_3$ powder) was 3:17. The two kinds of powders were added to the ball mill tank.

Step 2: An appropriate amount of an ethanol solution of PVB was added into the ball mill tank, in which ethanol served as a milling solvent, PVB served as a binder that facilitates the forming of the ceramic green body and was added with an amount of 1 wt % of the total mass of the mixed powder. An ultra-low wear rate zirconia ball was used for the ball milling, and a ball milling duration was 30 min.

After the ball milling, the slurry was dried to obtain a dry powder, which was then granulated through a 150 mesh sieve to obtain a uniformly mixed raw material powder.

Step 3: The raw material powder was pre-pressed under a pressure of 7 MPa, subjected to a heat treatment at 900° C. to remove organic substances in the green body and to decompose $Mg(NO_3)_2$ into MgO at the same time, and then subjected to cold isostatic pressing at 235 MPa to obtain ceramic billet. The ceramic billet was sintered in a vacuum atmosphere at a sintering temperature of 1400° C. for 2 h to obtain a luminescent composite ceramic material 1 (YAG-$Al_2O_3$—MgO), and a relative density of the luminescent composite ceramic material 1 was measured using the Archimedes method.

The parameters adopted in Example 5 are listed in Table 2 below.

Example 6: Preparation of Luminescent Composite Ceramic 2

Regarding the core-shell structured coated fluorescent powder 2, a luminescent composite ceramic material 2 (YAG-$Al_2O_3$—MgO) was prepared by the same method as Example 5, except adopting parameters of Example 6 listed in Table 2 below.

Example 7: Preparation of Luminescent Composite Ceramic Material 3

Regarding the core-shell structured coated fluorescent powder 3, a luminescent composite ceramic material 3 was prepared by the same method as Example 5, except adopting parameters of Example 7 listed in Table 2 below.

This example is different in the following aspects. In this example, a hot-pressing sintering was used. The powder after sieving granulation in Step 2 was subjected to a heat treatment at 600° C. to convert $Mg(NO_3)_2$ into MgO, and was loaded into a graphite mold to be pre-pressed at a pressure of 15 MPa, and then the graphite mold was placed in a hot-pressing sintering furnace. The sintering was performed under argon atmosphere, a sintering temperature was 1350-1550° C., a holding time was 0.5-2 h, and a sintering pressure was 30-60 MPa. After the sintering was completed, the pressure was lowered and a luminescent ceramic material 3 (YAG-$Al_2O_3$—MgO) was obtained with the cooling of the furnace.

The sintering parameters adopted in this example are listed in Table 2 below.

Example 8: Preparation of Luminescent Composite Ceramic Material 4

Regarding the core-shell structured coated fluorescent powder 4, a luminescent composite ceramic material 4 was prepared by the same method as Example 5, except adopting parameters of Example 8 listed in Table 2 below.

This example is different in the following aspects. An appropriate amount of an ethanol solution of $Mg(NO_3)_2$ and PVB was added to the ball mill tank, in which $Mg(NO_3)_2$ was decomposed to MgO, which served as a sintering aid in the subsequent sintering process. The addition amount of $Mg(NO_3)_2$ was calculated according to a theoretical addition amount of MgO being 1 wt % of the commercial $Al_2O_3$.

TABLE 2

| Parameter | Example 5 | Example 6 | Example 7 | Example 8 |
|---|---|---|---|---|
| Mass ratio of commercial $Al_2O_3$ powder to $Al_2O_3$ particles obtained by precipitation method | 1:4 | 1:1 | 3:1 | 1:4 |
| Mass ratio of fluorescent powder to total $Al_2O_3$ powder | 3:17 | 1:2 | 1:1 | 9:1 |
| Weight percentage of added PVB to total mixed powder (wt %) | 1 | 1 | 0 | 1 |
| Ball milling duration (min) | 30 | 40 | 50 | 30 |
| Pressure of pre-pressing (MPa) | 7 | 10 | 15 | 5 |
| Temperature of heat treatment (° C.) | 900 | 1100 | 600 | 900 |
| Pressure of cold isostatic pressing (MPa) | 235 | 200 | N.A. | 250 |
| Temperature of sintering (° C.) | 1400 | 1250 | 1500 | 1550 |
| Pressure of sintering | Vacuum | Vacuum | 40 MPa Argon | Vacuum |
| Holding time (h) | 2 | 0.5 | 0.5 | 2 |
| Relative density of ceramic | 98.5% | 95.4% | 99.5% | 97.5% |

The performances of the core-shell structured fluorescent powder and the luminescent composite ceramic YAG-$Al_2O_3$—MgO prepared using the core-shell structured fluorescent powder are described below with reference to FIGS. 1 to 4.

FIG. 1 is a SEM (Scanning Electron Microscope) image of the core-shell structured fluorescent powder according to Example 1 of the present disclosure. As shown in FIG. 1, in the core-shell structured fluorescent powder coated with $Al_2O_3$&MgO, the fluorescent powder core has a particle size of about 17 μm, and the particles coated on the surface of the large-sized fluorescent powder are nanoscale $Al_2O_3$ and MgO in the form of fine particles having a small particle size of about 10-50 nm. Such a core-shell structured coated fluorescent powder has beneficial effects on the subsequent preparation of the composite ceramic having superior performances. Similar results were also obtained for Examples 2-4 (not shown in the figures).

Figure 2:
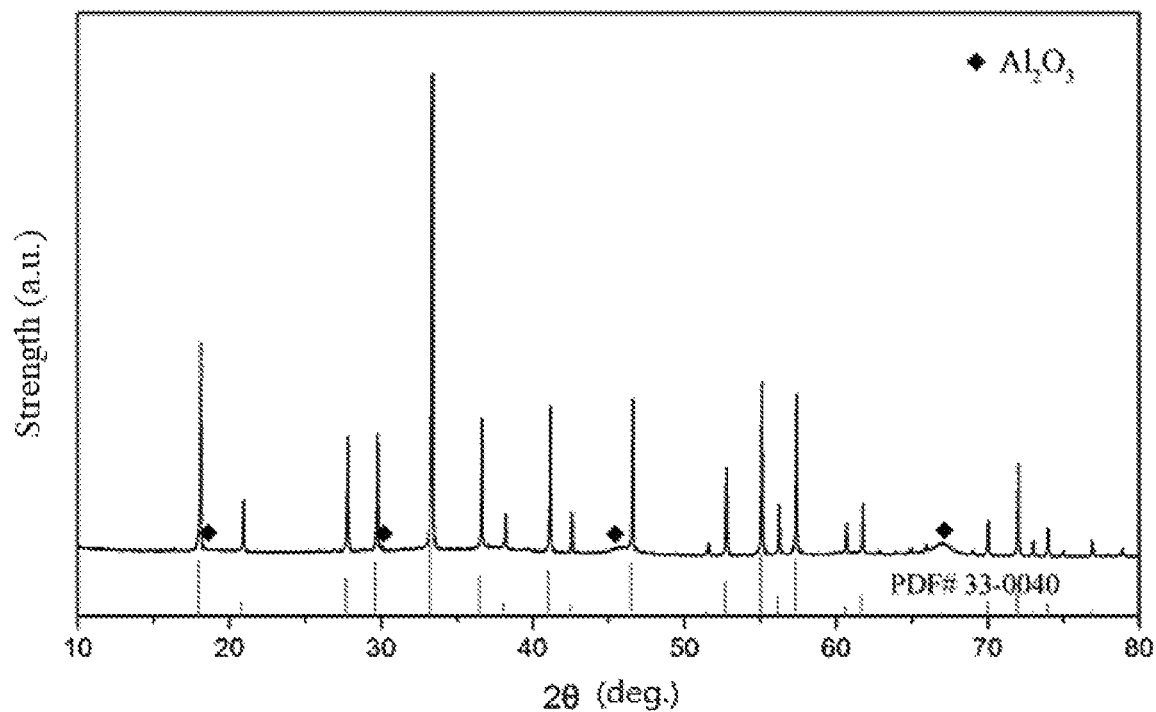
FIG. 2 is an XRD diagram of the core-shell structured fluorescent powder according to the present disclosure.

FIG. 2 is an XRD (X-Ray Diffraction) diagram of the core-shell structured fluorescent powder according to Example 1 of the present disclosure. As shown in FIG. 2, the horizontal axis represents an angle of 2θ and the unit thereof is degree (deg.); and the vertical axis represents intensity and the unit thereof is an arbitrary unit (a.u.). Using YAG card comparison, it can be seen from the diffraction spectrum that diffraction peaks of the fluorescent powder in the core-shell structured fluorescent powder/$Al_2O_3$&MgO powder match the diffraction peaks of the YAG card, and diffraction peaks of $Al_2O_3$ (shown as "♦" in FIG. 2) are relatively weak and small due to smaller particle size and weak crystallinity. As for the MgO, its content is small, and its crystallinity is poor, so that no obvious diffraction peak is observed. Similar results were also obtained for Examples 2-4 (not shown).

Figure 3:
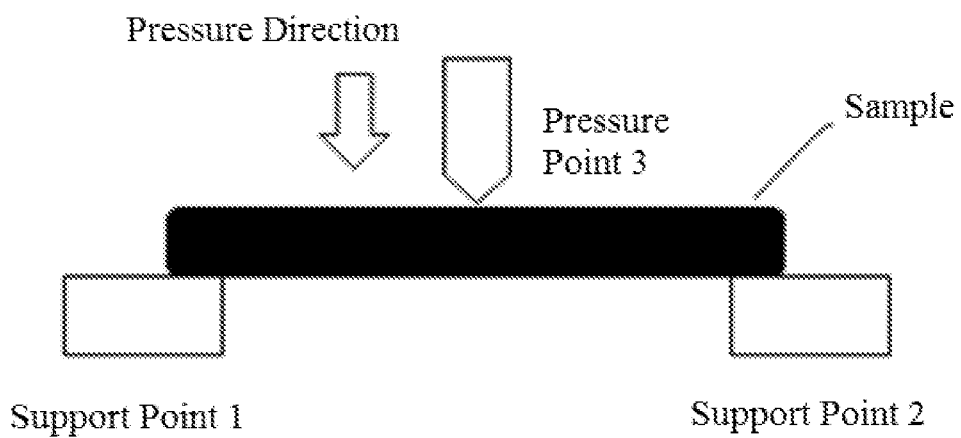
FIG. 3 shows a bending strength test of a sample of a luminescent composite ceramic YAG-$Al_2O_3$—MgO prepared with the core-shell structured fluorescent powder according to the present disclosure.

FIG. 3 shows a bending strength test of a sample of a luminescent composite ceramic YAG-$Al_2O_3$—MgO prepared with the core-shell structured fluorescent powder according to the present disclosure. As shown in FIG. 3, a three-point bending method is used to test the bending strength of the sample. Specifically, the sample was prepared into a long square block of 5×5×25 mm, and a pressure at the time when the sample was crushed was defined as the bending strength. Experiments (see Table 3) indicate that the luminescent composite ceramic YAG-$Al_2O_3$—MgO obtained by sintering ordinary fluorescent powder (sample 1, basically same as Example 5 except using the ordinary fluorescent powder as the raw material) has only a bending strength of 280 MPa, and the luminescent composite ceramic YAG-$Al_2O_3$—MgO (sample 2, made of the composite ceramic material of Example 5) sintered by using the core-shell structured coated fluorescent powder according to the present disclosure has a bending strength of up to 350 MPa. Thus, the core-shell structured coated fluorescent powder according to the present disclosure improves the mechanical performance of the samples of composite ceramic. Similar results were also obtained for Examples 6-8 (data is not shown).

TABLE 3

|  | Sample 1 | Sample 2 |
| --- | --- | --- |
| Bending strength | 280 MPa | 350 MPa |

The increase of the bending strength reflects the improved mechanical performance of the luminescent composite ceramic prepared by using the core-shell structured fluorescent powder as the raw material.

Figure 4:
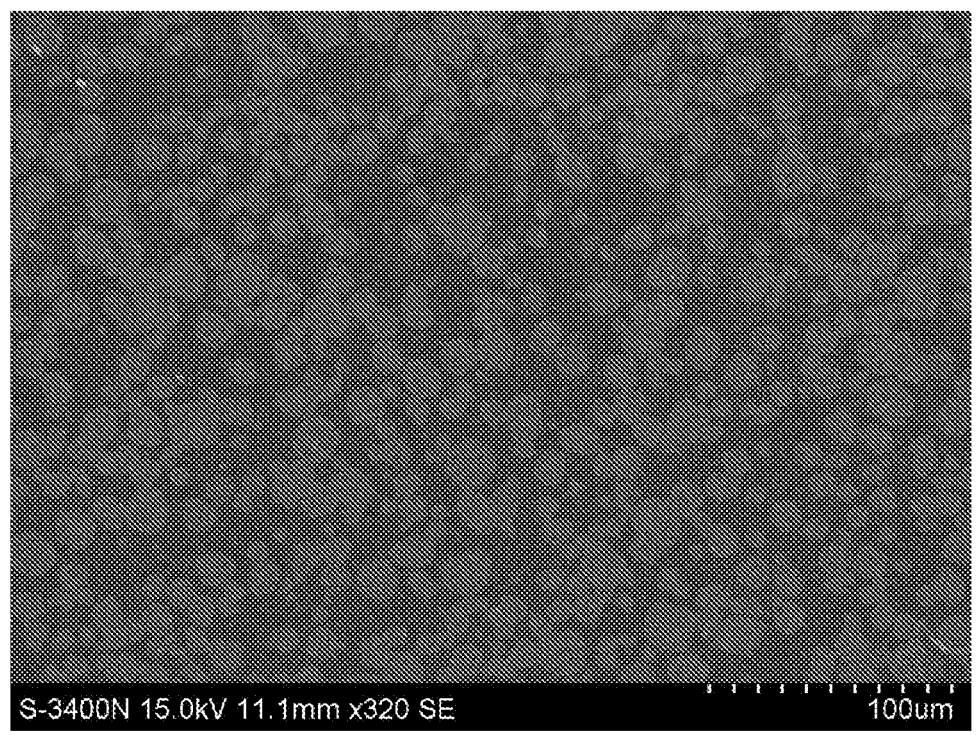
FIG. 4 is an SEM image of a sample of the luminescent composite ceramic YAG-$Al_2O_3$—MgO prepared with the core-shell structured fluorescent powder according to the present disclosure.

FIG. 4 is an SEM image of the sample of the luminescent composite ceramic material YAG-$Al_2O_3$—MgO (Example 5) prepared with the core-shell structured fluorescent powder according to the present disclosure. As shown in FIG. 4, the core-shell structured fluorescent powder according to the present disclosure and $Al_2O_3$ are uniformly distributed, the alumina has a grain particle size of 0.5-5 μm, the interface bonding degree between the fluorescent powder and $Al_2O_3$ is high, a porosity is low, and the ceramic has a high density, thereby enhancing the mechanical performances of the luminescent composite ceramic. Similar results were also obtained for Examples 6-8 (images are not shown).

The composite ceramic and the method of preparing the composite ceramic according to the present disclosure are described above, but the present disclosure is not limited thereto. Those skilled in the art understand that various modifications, combinations, secondary combinations and variations can be made without departing from the essence or scope defined by the pending claims.

What is claimed is:

1. A preparation method for a composite ceramic, wherein the preparation method comprises:
   using core-shell structured coated fluorescent powder, alumina, and a sintering aid as raw materials, and ball-milling, pre-pressing and then sintering the raw materials to obtain the composite ceramic,
   wherein the alumina has a particle size of 0.1 μm to 2 μm;
   a core portion of the core-shell structured coated fluorescent powder is fluorescent powder, and the core portion has a core radius of 1 μm to 10 μm;
   a shell portion of the core-shell structured coated fluorescent powder contains alumina or a precursor thereof, and the shell portion has a particle size of 10 nm to 80 nm;
   a weight ratio of the alumina of the shell portion of the core-shell structured coated fluorescent powder to the alumina of the raw materials is 1:3 to 4:1;
   a weight ratio of the fluorescent powder of the core portion of the core-shell structured coated fluorescent powder to a sum of the alumina of the shell portion and the alumina of the raw materials is 3:17 to 9:1; and
   a weight ratio of the sintering aid to the sum of the alumina of the shell portion and the alumina of the raw materials is 0.2 wt % to 3 wt %.

2. The method according to claim 1, wherein the shell portion of the core-shell structured coated fluorescent powder contains a sintering aid or a precursor thereof,
   wherein the sintering aid is selected from the group consisting of MgO, $Y_2O_3$, and combinations thereof, and the precursor of the sintering aid is selected from the group consisting of $Mg(OH)_2$, $Y(OH)_3$, and combinations thereof.

3. The preparation method according to claim 1, wherein the core-shell structured coated fluorescent powder is synthesized by following steps:
   step 1: preparing an aqueous solution of a soluble aluminum salt, the aqueous solution optionally comprising a soluble salt of the sintering aid or a soluble salt of cation of the sintering aid;
   step 2: preparing a precipitant solution having a pH of 4 to 10, adding a surfactant to the precipitant solution, adding the fluorescent powder, and performing ultrasonic dispersing to obtain a fluorescent powder suspension, wherein the fluorescent powder has a radius of 1 μm to 10 μm; and
   step 3: dropwise adding the aqueous solution obtained in the step 1 to the fluorescent powder suspension obtained in the step 2, and performing aging, solid-liquid separation, drying, and optional heat treatment to obtain the core-shell structured coated fluorescent powder.

4. The method according to claim 1, wherein the sintering is vacuum sintering, and the vacuum sintering satisfies any one or both of following conditions (a) and (b):
   (a) a sintering temperature is 1250° C. to 1550° C.; and
   (b) a holding time is 0.5 h to 6 h.

5. The method according to claim 1, wherein the sintering is hot-pressing sintering, and the hot-pressing sintering satisfies any one or more of following conditions (a) to (c):
   (a) a sintering temperature is 1350° C. to 1550° C.;
   (b) a holding time is 0.5 h to 2 h; and
   (c) a sintering pressure is 30 MPa to 60 MPa.

6. The method according to claim 1, wherein both a crystal phase of the alumina of the shell portion of the core-shell structured coated fluorescent powder and a crystal phase of the alumina of the raw materials are $\alpha$-$Al_2O_3$.

7. The method according to claim 1, wherein the core-shell structured coated fluorescent powder is one or two of an $Al_2O_3$ coated fluorescent powder, an $Al_2O_3$ and MgO coated fluorescent powder, or an $Al_2O_3$ and $Y_2O_3$ coated fluorescent powder.

8. The method according to claim 3, wherein the heat treatment is performed at 1100° C. to 1300° C. for 2 h to 5 h.

9. The method according to claim 1, wherein the composite ceramic comprises a ceramic matrix, the sintering aid, and the fluorescent powder, the ceramic matrix is an alumina sintered body, and in the composite ceramic, the fluorescent powder is not sintered and is dispersed in a form of particles in the ceramic matrix.

10. The method according to claim 9, wherein the ceramic matrix has a relative density of 95% to 99.9%.

11. The method according to claim 9, wherein alumina in the ceramic matrix has a grain size of 0.5 μm to 5 μm.

12. The method according to claim 1, wherein the fluorescent powder is YAG:$Ce^{3+}$ and/or LuAG:$Ce^{3+}$.

13. The method according to claim 9, wherein the weight ratio of the fluorescent powder to the ceramic matrix is 1:5 to 5:1, preferably 1:3 to 2:1, more preferably 1:2 to 1:1.

14. The method according to claim 1, wherein a relative density of the composite ceramic is 98% to 99.9%.

\* \* \* \* \*